(12) United States Patent
Mednieks et al.

(10) Patent No.: US 8,611,947 B2
(45) Date of Patent: Dec. 17, 2013

(54) SYSTEMS AND METHODS FOR AUGMENTING COMMUNICATIONS PROTOCOLS

(75) Inventors: Zigurd Mednieks, Harvard, MA (US); David Y. Wong, Santa Barbara, CA (US)

(73) Assignee: D2 Technologies, Inc., Santa Barbara, CA (US)

(*) Notice: Subject to any disclaimer, the term of this patent is extended or adjusted under 35 U.S.C. 154(b) by 688 days.

(21) Appl. No.: 12/214,359

(22) Filed: Jun. 17, 2008

(65) Prior Publication Data

US 2009/0111509 A1  Apr. 30, 2009

Related U.S. Application Data

(60) Provisional application No. 60/982,684, filed on Oct. 25, 2007.

(51) Int. Cl.
*H04M 1/00* (2006.01)
*H04M 3/00* (2006.01)

(52) U.S. Cl.
USPC ...................... 455/552.1; 455/418

(58) Field of Classification Search
USPC .......... 455/552.1, 550.1, 553.1, 556.1, 556.2, 455/403, 416–422.1, 459, 466, 566; 370/351–356, 260, 310.2, 328, 338; 709/246, 226–229, 206, 207
See application file for complete search history.

(56) References Cited

U.S. PATENT DOCUMENTS

| 6,976,092 B1* | 12/2005 | Daniell et al. ................. 709/246 |
| 7,315,613 B2* | 1/2008 | Kleindienst et al. ....... 379/88.13 |
| 2002/0039149 A1 | 4/2002 | Perez |
| 2004/0015547 A1* | 1/2004 | Griffin et al. ................. 709/204 |
| 2006/0003745 A1 | 1/2006 | Gogic |
| 2006/0045124 A1 | 3/2006 | Dahlstrom et al. |
| 2006/0156251 A1* | 7/2006 | Suhail et al. .................. 715/809 |
| 2007/0192325 A1 | 8/2007 | Morris |
| 2007/0223462 A1* | 9/2007 | Hite et al. ..................... 370/356 |
| 2008/0261569 A1* | 10/2008 | Britt et al. .................. 455/414.1 |

OTHER PUBLICATIONS

"Pidgin-facebookchat Facebook Chat plugin for Pidgin." http://www.code.google.com/p/pidgin-facebookchat/wiki/ How_To_Install. Last accessed Feb. 2, 2009. (3pgs).
"ThirdPartyPlugins-Pidgin-Trac." http://developer.pidgin.im/wiki/ThirdPartyPlugins. Last accessed Feb. 2, 2009. (3pgs).
"C Plugin How-To." http://developer.pidgin.im/wiki/CHowTo. Last accessed Feb. 2, 2009. (1pg).

* cited by examiner

*Primary Examiner* — San Htun
(74) *Attorney, Agent, or Firm* — Carr & Ferrell LLP

(57) ABSTRACT

A method, computer program, and system for augmenting communications protocols. Communications are received with which at least one protocol is determined to be associated. The at least one protocol may be configured to control at least one of the communications. Parameters associated with the at least one protocol are identified. In turn, at least one rule is accessed that is based on the at least one protocol and the parameters. Subsequently, a user is provided with at least one communications-control option according to the at least one rule.

18 Claims, 5 Drawing Sheets

SYSTEMS AND METHODS FOR AUGMENTING COMMUNICATIONS PROTOCOLS

CROSS-REFERENCE TO RELATED APPLICATIONS

This application claims the priority benefit of U.S. provisional patent application No. 60/982,684 filed Oct. 25, 2007 and entitled "Systems and Methods for Providing Unified Mobile Communications."

BACKGROUND

1. Technical Field

The present invention relates generally to communication networking, and more particularly to augmenting communications protocols.

2. Description of Related Art

Conventionally, in communication networks, boundaries between a service, a protocol, and an account are indefinite. For example, the service may be described as the protocol or vice versa. In some instances, the protocol may support a function that is not supported by the service. Additionally, varying communication services do not coordinate with each other, thereby restricting a user to accessing only one at a time.

SUMMARY OF THE INVENTION

A method, computer program, and system for augmenting communications protocols. Communications are received with which at least one protocol is determined to be associated. The at least one protocol may be configured to control at least one of the communications. Parameters associated with the at least one protocol are identified. In turn, at least one rule is accessed that is based on the at least one protocol and the parameters. Subsequently, a user is provided with at least one communications-control option according to the at least one rule.

DETAILED DESCRIPTION

Figure 1:
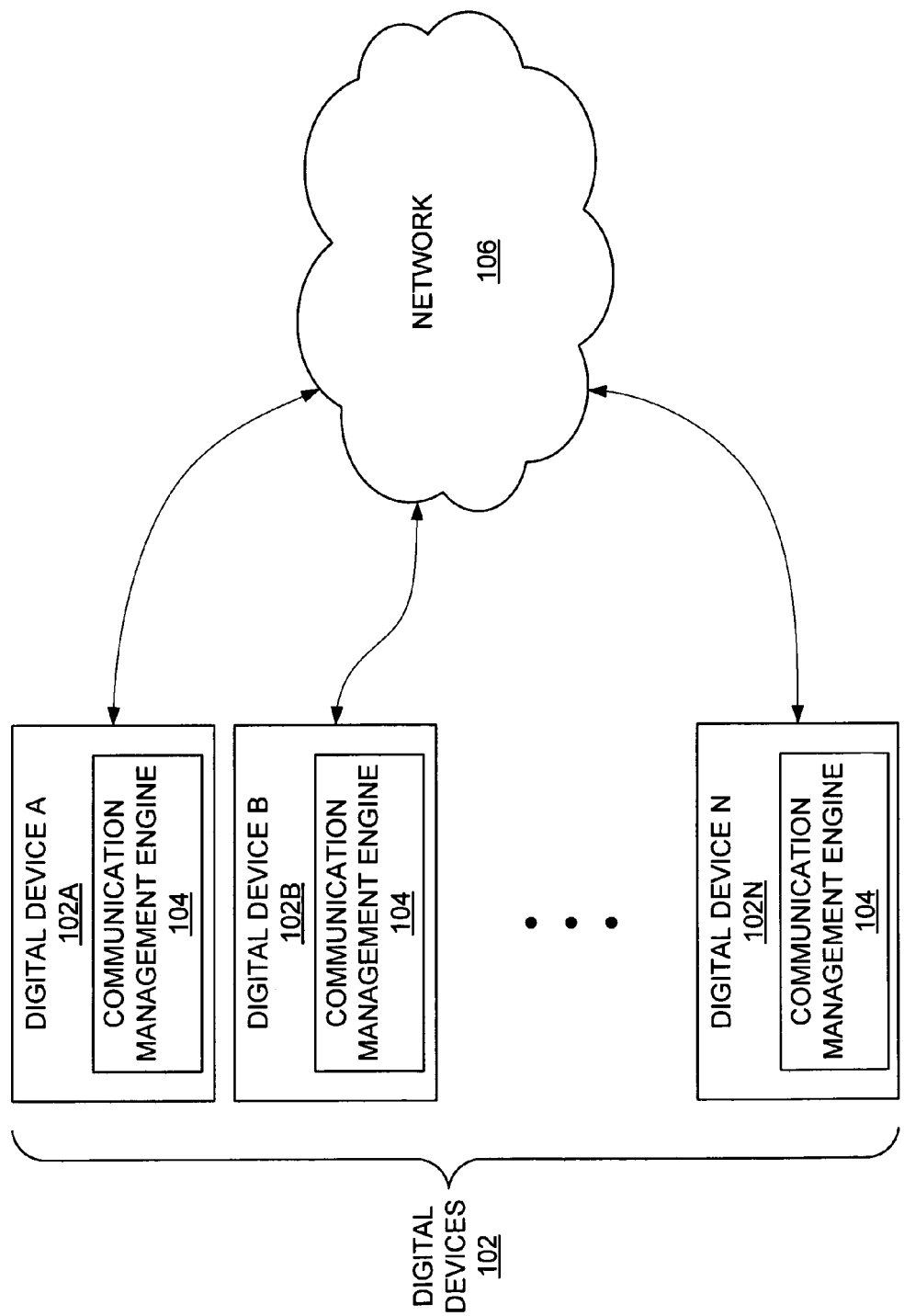
FIG. 1 is a block diagram of an exemplary environment for augmenting communications protocols.

Referring to FIG. 1, a block diagram of an exemplary environment for augmenting communications protocols is shown. Augmentation of communications protocols may allow a digital device that is configured to receive multiple types of communications (e.g., phone calls, email, text messages, etc.) to manage received communications that are encoded differently or are associated with different protocols. Additionally, the user may link, or combine, communication sessions of the same or varying types in accordance with various embodiments.

FIG. 1 shows two or more digital devices 102, such as a digital device A 102A, a digital device B 102B, and a digital device N 102N, which are in communication via a network 106. The digital devices 102 may receive communications from other devices (e.g., the digital devices 102) via the network 106 and may include a communication management engine 104. Digital devices 102 that include a communication management engine 104 may also be capable of communicating via the network 106 to digital devices that lack a communication management engine 104. Although digital devices 102 are discussed herein, any type of device may be utilized to provide the integrated contact-based interface according to some embodiments. The network 106 may include, for example, a telecommunications network, a cellular phone network, a local area network (LAN), a wide area network (WAN), an intranet, and the Internet.

According to some embodiments, the digital devices 102 can access the communication management engine 104 via a network, such as the network 106, being in communication remotely rather than including the communication management engine 104. For instance, there may be a single communication management engine 104 that all digital devices 102 couple to via the network 106. In one embodiment, the digital devices 102 may connect to the communication management engine 104 periodically. Alternately, the digital devices may connect when an event occurs, such as when the user activates an application or initiates a communication on one or more of the digital devices 102.

Figure 2:
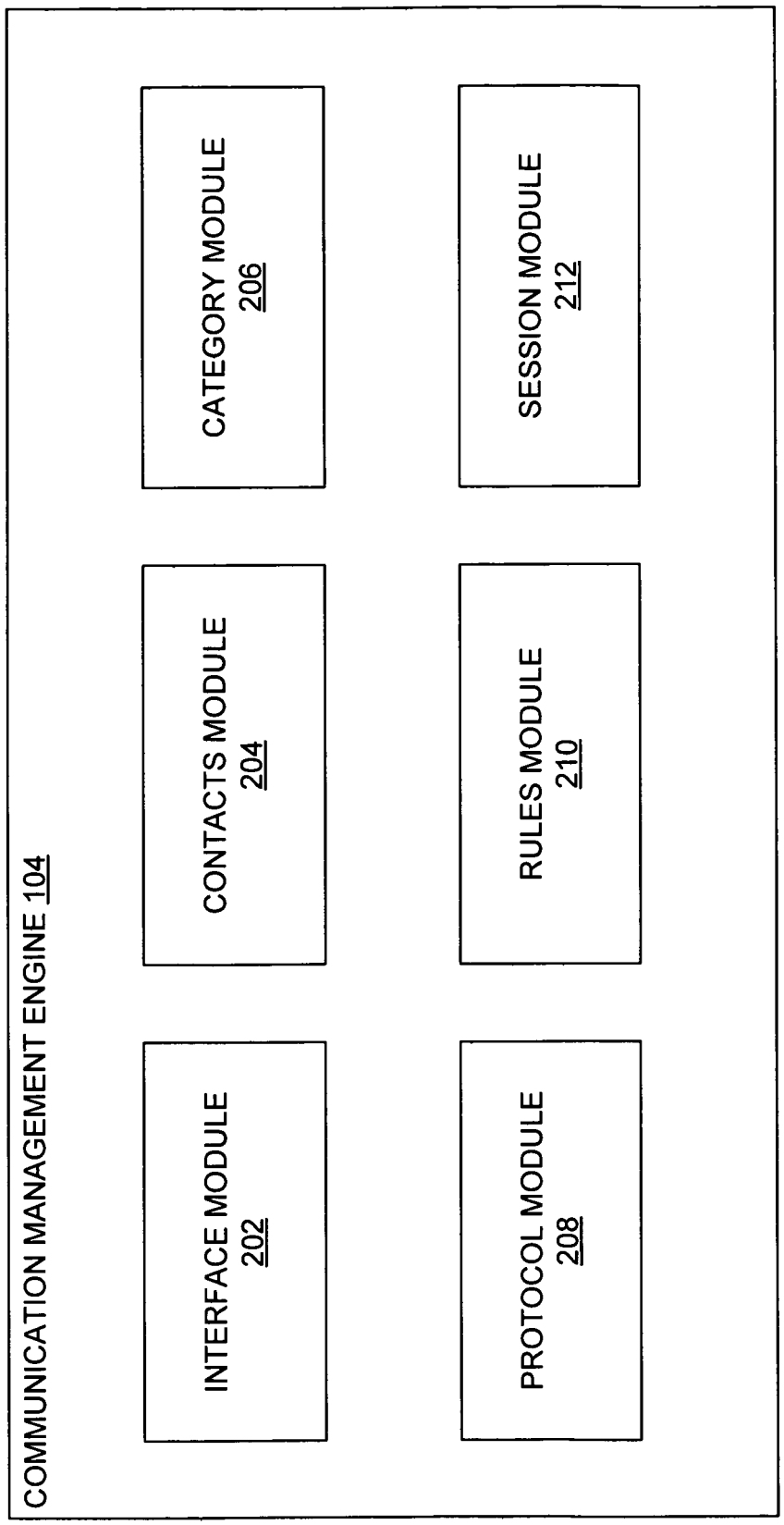
FIG. 2 is a block diagram of an exemplary communication management engine.

FIG. 2 is a block diagram of an exemplary communication management engine, such as the communication management engine 104 shown in FIG. 1. The communication management engine 104 may include at least an interface module 202, a contacts module 204, a category module 206, a protocol module 208, a rules module 210, and a session module 212. Although FIG. 2 describes the communication management engine 104 as including various modules, fewer or more modules may comprise the communication management engine 104 and still fall within the scope of various embodiments.

The interface module 202 may facilitate communication between the communication management engine 104 and the digital devices 102. Furthermore, the interface module 202 may allow the user to interact with and manipulate one or more of the digital devices 102 and the modules 204-212. In one example, the interface module 202 may communicate data, such as single or multiple telephone calls, voice over internet protocol (VoIP), email, video conferencing, picture messages, voice messages, text messages, error messages, software updates, and so forth, to the digital devices 102.

According to some embodiments, the interface module 202 may facilitate network management. Network management may allow networks (e.g., the network 106) to be searched or allow the user to search for networks. Additionally, automatic detection, memorization, and/or prioritization of the networks and logins may be provided. In one embodiment, the interface module 202 may facilitate synchronization of the digital devices 102 with peripheral devices, such as via Bluetooth, infrared, USB, flash cards, Wi-Fi sync, and the like. According to some embodiments, preferences may be stored by the interface module 202. Some examples of preferences may include preferred services, browsers, system settings, skins, ring-tones, and so on. Examples of services may include GoogleTalk™ and Verizon™ Wireless.

The contacts module 204 may store and organize certain information associated to the communication partners of the user (e.g., friends, family, businesses, etc.). The contacts module 204 may be accessed by the digital devices 102 via the interface module 202. Examples of the information related to one of the communication partners may include name, phone numbers, email address, mailing address, photo, and so on. The information may be entered manually by the user or be downloaded, wholly or partly, for example via the interface module 202. The communication partner information may be retrieved from a remote location, such as with conventional caller ID.

The contacts module 204 may also provide a unified contact list for all types of communication services. The unified contact list may further provide presence information. Presence information, or simply "presence," indicates to the user the ability or willingness of a given communication partner to communicate. For example, the user may be able to determine the state of the communication partner's availability as "free for chat," "busy," "out-to-lunch," and so on. This may also be implied in the context of a "buddy-list." The contacts module 204 may convey presence information for multiple communication partners over multiple types of communication services in a single list, arrangement, or other display.

The category module 206 may be provided for determining the type of communication received by one or more of the digital devices 102. The type of communication may include, for example, telephone calls, email, video conferencing, picture messages, voice messages, text messages, error messages, and software updates. The type of communication may determine or affect how the communication is conveyed to the user.

The protocol module 208 may be provided to determine protocols associated with the communications received by one or more of the digital devices 102. The protocols may initiate and/or control the communications in accordance with various embodiments. The protocol module 208 may also identify parameters associated with the protocols. In one example, the protocols may relate to mobile network signaling. For example, GoogleTalk™ may implement the protocol XMPP. The parameters may augment one or more protocols. Different types of communications are often accommodated by different services, each service having its own protocols and/or parameters. Some of the parameters may be passed on to the protocol module 208 by a service provider, while other parameters may require a separate, potentially predefined, description. A manifest may be generated that describes parameters for a particular service. The manifest may also be needed if an otherwise obtained protocol is not necessarily reliable. The manifests may include a variety of categories of information, such as, for example, parameters of a particular service, capabilities of that service, and capacity of the service or network.

In some cases, standard parameters may be appropriate for all aspects of a particular communication protocol. In other cases, it may be possible to query the protocol to determine whether the protocol has, for example, certain capabilities or capacities. Oftentimes, the manifest will provide for the case in which the protocol was not specifically designed to perform a given function, or at least not perform the given function sufficiently well. The manifests may indicate the differences between how a queried protocol indicates to perform the given function and how the given function should ultimately be performed by one or more of the digital devices 102. The manifests may also indicate how the parameters augment the protocol. In one example, the queried protocol may indicate that when one or more of the digital devices 102 is currently involved in a voice call, additional incoming voice calls should be redirected to the user's voicemail, when actually the additional incoming voice calls should not be redirected to the user's voicemail. Instead of being redirected to the user's voicemail, the additional incoming voice calls may be directed to a module included in the communication management engine 104, such as the session module 212.

One example of a case where the manifest may be used is when one or more of the digital devices 102 is connected to three separate services that all use session initiation protocol (SIP). Since SIP can be used in many ways, one service could be a commercial service that is meant to emulate traditional telephony, and thus can only accommodate one phone call at a time. Another service may have many features (e.g., call waiting and 3-way calling). The third service may have one feature (e.g., call waiting). The manifest may describe every feature that the particular service is capable of providing and which features the particular service actually provides. Therefore, the manifest may reflect how one or more of the digital devices 102 should operate when connected to the particular service.

The rules module 210 may also be provided in association with the communication management engine 104. The rules module 210 may determine a course of action when an event occurs. In one example, a rule may determine which capabilities of a specific service are to be used. According to some exemplary embodiments, the user may select settings for rules associated with all types of communication except voice. The user may also opt for default settings. Based on the protocols, the parameters, and/or the manifests, the rules module 210 may only allow options that are available for the particular service to be offered to the user by the session module 212.

The session module 212 may be provided to manage communication sessions and provide the user with communications-control options according to the rules determined by the rules module 210. In one example, the communications-control option may prompt the user to indicate how to handle an incoming communication. According to various embodiments, graphical or textual representation of the communication sessions may be provided. In one example, a list of key-words (e.g., first names, nick names, and business names) may be presented to the user in a session list. Each key-word may represent a distinct communication session. The communication sessions may be ordered in the session list in various ways (e.g., alphabetical order, order of when the sessions were most recently used by the user, and a user-defined order).

The communication session may become active when the user or communication partner initiates a communication. When the communication session becomes active, the text that represents the communication session in the session list may blink, flash, change color, or become otherwise accentuated, to indicate to the user that the communication session is active. In another example, a group of unique icons (e.g., pictures, cartoons, and portrait images of the communication partners) may represent the communication sessions and be presented to the user. The icons may be arranged in a square array or other distribution specified by the user. The icons may change appearance when the communication session that the icons represent becomes active. In other embodiments, both textual and graphical representations may be used for the communication sessions in the session list. One example may be when each communication session is represented by the communication partner's name and portrait image.

According to some embodiments, the session module 212 may organize the communication sessions as a threaded discussion. To illustrate, the threaded discussion may be described as an electronic discussion (e.g., a back and forth communication between users via email, bulletin board, newsgroup, or forum) in which software aids the user by visually grouping messages. Messages that are grouped visually in a hierarchy by topic are called a topic thread or simply a "thread."

The session module 212 may present unified presence information for all communication types. In one example, the user may be able to determine from a single list based on the unified presence information that a first communication partner is available for a SMS communication, that a second communication partner is available for a voice communication, and so on. The unified presence information provided by the session module 212 may allow the availability of multiple communication partners using multiple communication types to be presented in one list, arrangement, or other display, as discussed further herein. The session module 212 may present the list to the user such that the user perceives the sessions in the list to be substantially similar, regardless of the communication types of the sessions in the list. The session module 212 may also allow the user to manage multiple accounts, services, and networks. In addition, the session module 212 may facilitate the integration of the session list with calendar and data history information. For example, a calendar event (e.g., a date and time entry of an appointment) may appear on the session list at a predetermined amount of time prior to the calendar event to serve as a reminder to the user. The reminder may include information related to the calendar event (e.g., a phone number and an address).

According to some embodiments, the session module 212 may facilitate a multiple-participant communication session. The communications involved in the multi-participant communication session may each be associated with different protocols and/or be encoded differently. In one example, the user may be involved in a call with a second call on hold, such as by using call waiting. The two calls may be treated as two distinct communication sessions by the session module 212. While both sessions are active, the user may link, or combine, the sessions together resulting in a three-way conversation. The user may also receive additional calls while the three-way session is active. As communications are received and new distinct sessions are generated, options may be made available to the user based on the rules established by the rules module 210. According to exemplary embodiments, the additional calls may also be linked together, resulting in X-way conversation capability, where "X" can be any number. Furthermore, there may be a plurality of X-way conversation sessions accommodated simultaneously by the session module 212, where each X-way conversation may be a distinct session in the session list.

The session module 212 may provide for communication similar to that described herein including differing communication types, such as IM and voice call. In one example, the user participates in an IM conversation, which is treated as a distinct session by the session module 212. The user receives an incoming voice call, which is also treated as a distinct session by the session module 212. The user can put the IM session on hold and answer the voice call. Therefore non-voice sessions, such as IM sessions, may be treated by the session module 212 in a similar fashion as voice sessions. The user may participate in non-voice sessions and voice sessions simultaneously. Additionally, non-voice sessions can be linked, or combined, into X-way text conversations, where "X" can be any number, as discussed herein.

In some embodiments, when an IM, or other non-voice, communication is initiated by the communication partner, one or more of the digital devices 102 may ring or provide another indication (e.g., vibrate one or more of the digital devices 102) to prompt the user that the IM, or other non-voice, communication is initiated. According to various embodiments, the IM communication initiated by the communication partner may simply appear as a new session on the session list presented to the user or as a flashing icon. The user may be presented with the option to respond. However, if the user chooses to ignore the IM communication initiated by the communication partner, the new session may disappear from the session list after a period of time lapses. The period of time may be a default value or the period of time may be defined by the user.

In yet another embodiment, the session module 212 may provide the user with the ability to access and manage multiple accounts (e.g., email accounts) from any number of servers (e.g., email servers). The session module 212 may treat individual email accounts as distinct sessions in the session list. The session module 212 may also allow for email account management, such as login data.

Figure 3:
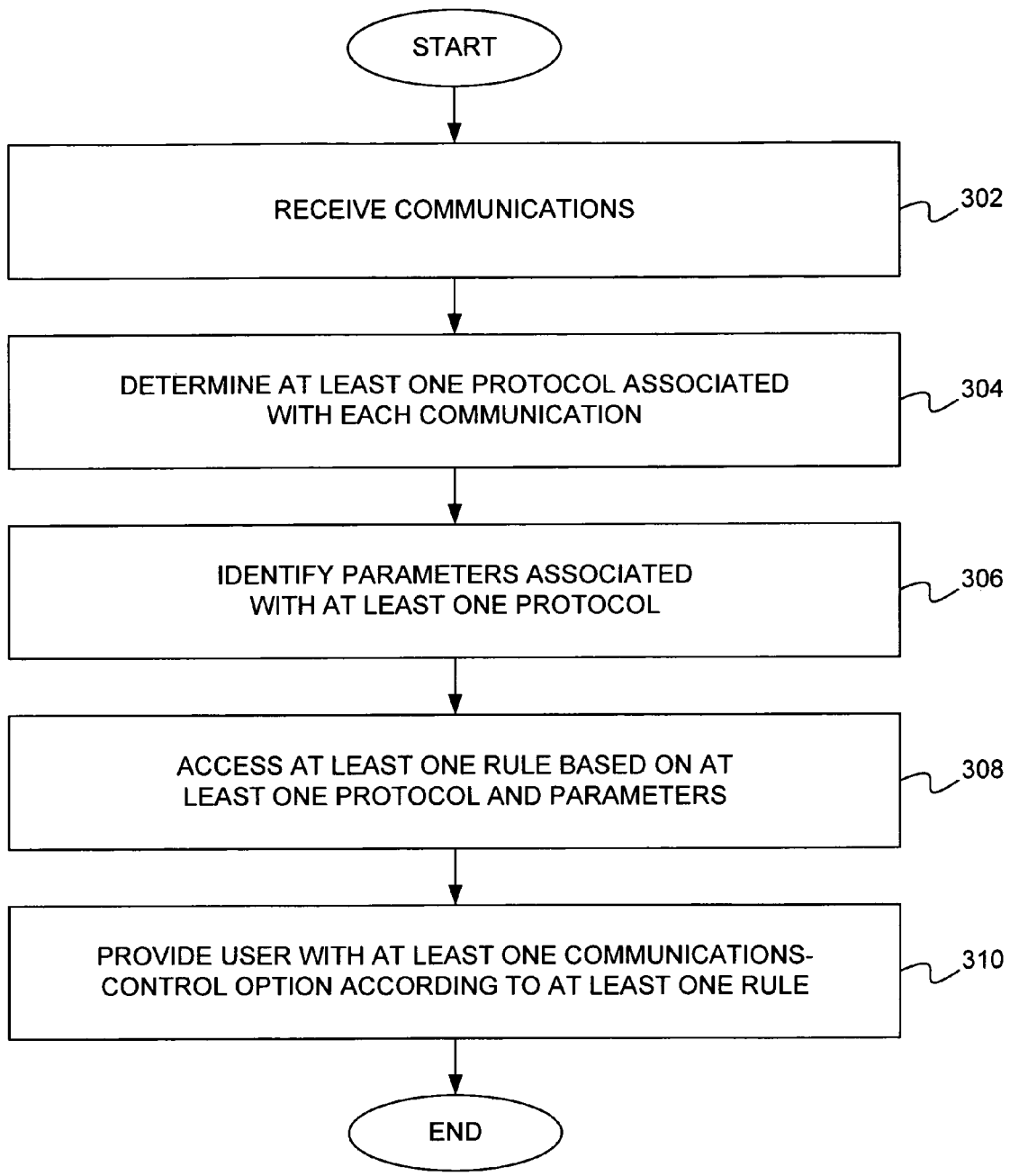
FIG. 3 is a flowchart showing an exemplary process for augmenting communications protocols.

FIG. 3 is a flowchart showing an exemplary process for augmenting communications protocols utilized by devices, such as the digital devices 102 described herein. The digital devices 102 may include, for example, cellular phones, smart phones, wireless phones, personal digital assistants (PDA), pocket PCs, laptop PCs, desktop PCs, and so on, according to various exemplary embodiments.

At step 302, communications are received. The communications may be received synchronously or sequentially according to various embodiments. As discussed herein, the communications may be of a variety of types including voice, text, video, and so on. Furthermore, communications from any number of service providers may be received. The communication management engine 104 may manage the received communications received by one or more of the digital devices 102. According to one exemplary embodiment, the interface module 202 may facilitate synchronizing one or more of the digital devices 102, or components thereof, with a peripheral device, as discussed herein.

At step 304, at least one protocol associated with each of the communications is determined. According to various embodiments, the protocol module 208 may perform the step 304. As discussed herein, the protocols may initiate and/or control the communications. According to various embodiments, the protocol alone may insufficiently describe the capabilities of the communications.

At step 306, parameters are identified that are associated with the at least one protocol determined in the step 304. As discussed herein, the protocol module 208 may also perform the step 306. The parameters may augment one or more protocols. Some of the parameters may be passed on to the protocol module 208 by the service provider, while other parameters may require separate and/or predefined descriptions. The manifest may be generated that describes the parameters for a given service and how the parameters may augment the protocols. The manifest may be needed if an otherwise obtained protocol (e.g., the at least one protocol determined in the step 304) is not necessarily reliable. The manifests may include a variety of categories of information for example, parameters of various services, capabilities of the services, and capacity of the services or networks. In some embodiments, the manifests may indicate the differences between how a queried protocol indicates to perform the given function and how the given function should ultimately be performed by one or more of the digital devices 102.

At step 308, at least one rule is accessed. The at least one rule is based on the at least one protocol, such as that determined in the step 304, as well as the parameters, such as those identified in the step 306. As discussed herein, the rules module 210 may be used to access the at least one rule. Rules may determine a course of action when an event occurs. For example, one rule may govern the options presented to the user when a communication is received based on the type of communication.

At step 310, the user is provided with at least one communications-control option according to the at least one rule. As discussed in detail herein, the session module 212 may be used to provide communications-control options according to the rules accessed by the rules module 210. According to various embodiments, the user may also be provided with a variety of communication management options and tools. The communications-control options provided may depend on the type of communication received or, in some embodiments, the protocols, the parameters, and/or the manifest. In one example, at least two of the communications may be combined into a single session. In other embodiments, the communications may be integrated into a threaded discussion by the session module 212. The session module 212 may generate a session list based on the contact identifier associated with each of the communications.

Figure 4:
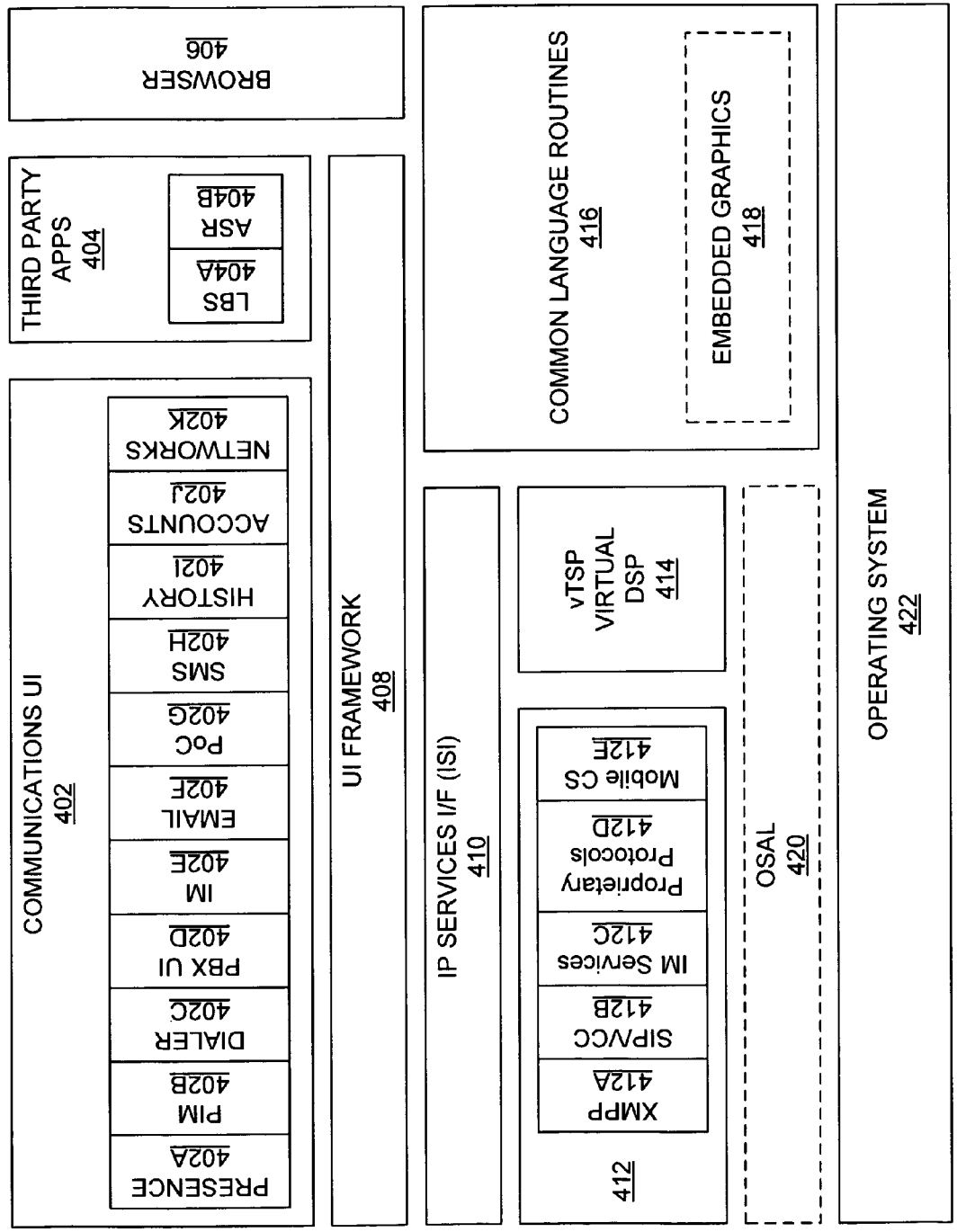
FIG. 4 is a block diagram of an exemplary architecture augmenting communications protocols.

FIG. 4 is a block diagram of an exemplary architecture 400 for providing an integrated contact-based interface. The architecture 400 may include a communications user interface (UI) module 402, a third party applications module 404, a browser module 406, a UI framework module 408, an IP services I/F (ISI) module 410, a protocols module 412, a vTSP virtual DSP module 414, a common language routines module 416, and an operating system module 422, according to some embodiments. Additionally, an embedded graphics module 418 and an OSAL module 420 may be included in exemplary embodiments.

The communications UI module 402 may include a presence module 402A, a protocol independent multicast (PIM) module 402B, a dialer module 402C, a private branch exchange (PBX) UI module 402D, an instant messaging (IM) module 402E, an email module 402F, a push-to-talk over cellular (PoC) module 402G, a short message service (SMS) module 402H, a history module 402I, an accounts module 402J, and a networks module 402K, according to some embodiments. An example of presence information, which may be implemented by the presence module 402A, may be a status indicator that conveys ability and willingness of a potential communication partner to communicate. PIM, which may be provided by the PIM module 402B, may provide one-to-many and many-to-many distribution of data over a network, such as the network 106. A dialer, which the dialer module 402C may provide, may be an electronic device or a virtual device that is used in telephony to monitor the dialed numbers and alter them to seamlessly provide services that may otherwise require lengthy access codes to be dialed. PBX, as may be used in conjunction with the PBX UI module 402D, is a telephone exchange that serves a particular business or office, as opposed to one that a common carrier or telephone company operates for many businesses or for the general public. IM, which may be provided by the IM module 402E, is a form of real-time communication between two or more people based on typed text. Email, which may be provided by the email module 402F, may be a store and forward method of composing, sending, storing, and receiving messages over electronic communication systems. PoC, which may be provided by the PoC module 402G, is a method of conversing on half-duplex communication lines (e.g., two-way radio) using a momentary button to switch from voice-reception mode to voice-transmission mode that is provided over a network, such as the network 106. SMS, which may be provided by the SMS module 402H, allows the interchange of short text messages between devices, such as mobile telephones. The history module 402I may provide a record of the communications performed by the digital devices 102. The accounts module 402J may, according to some embodiments, manage the simultaneous usage of multiple user accounts for various services. The networks module 402K may allow the usage of multiple networks potentially based on various technologies.

The third party applications module 404 may include a location based services (LBS) module 404A and an automatic speech recognition (ASR) module 404B according to some embodiments. Optionally, application development tools may be included.

The protocols module 412 may include an extensible messaging and presence protocol (XMPP) module 412A, a session initiation protocol (SIP)/VCC module 412B, an IM services module 412C, a proprietary protocols module 412D, and a Mobile CS module 412E according to some embodiments. Mobile CS, as may be provided by the Mobile CS module 412E, is an AT command set for mobile voice service. According to some embodiments, the common language routines module 416 may include Microsoft .NET common language routines (e.g., J#, C#).

Figure 5:
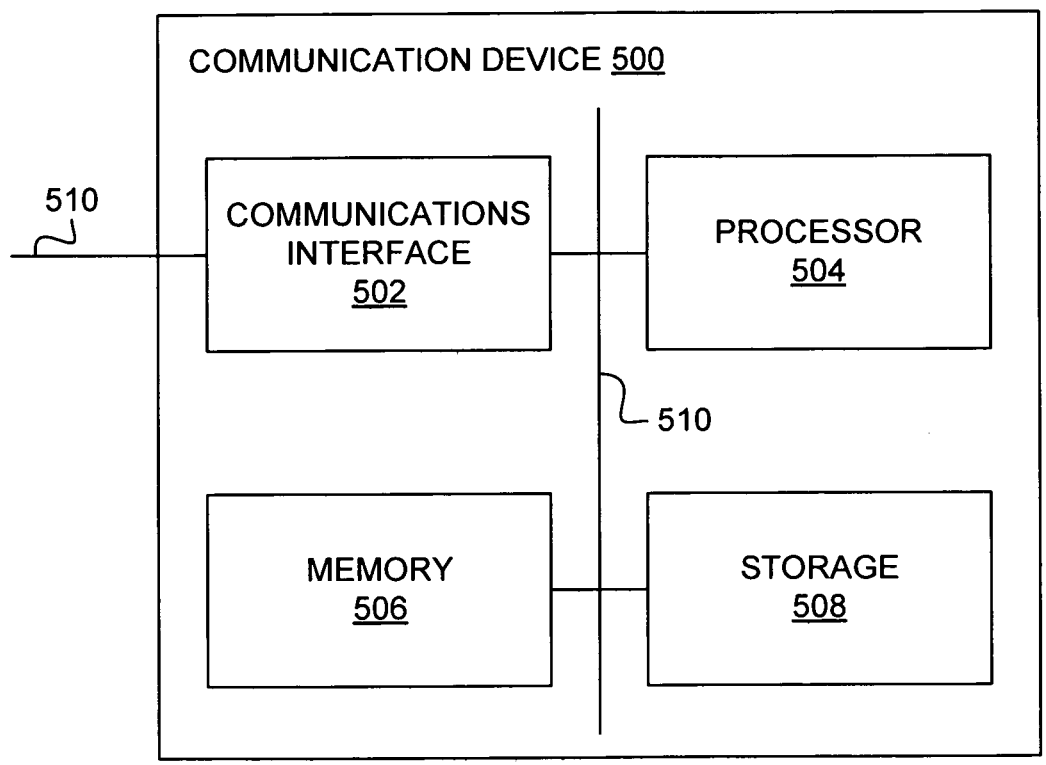
FIG. 5 shows an exemplary communication device.

FIG. 5 shows an exemplary communication device. The communication device 500 may comprise the communication management engine 104 or the digital devices 102 according to some embodiments. The communication device 500 comprises at least a communications interface 502, a processor 504, a memory 506 and storage 508, which are all coupled to the bus 510. The bus 510 provides communication between the communications interface 502, the processor 504, the memory 506, and the storage 508.

The processor 504 executes instructions. The memory 506 permanently or temporarily stores data. Some examples of memory 506 are RAM and ROM. The storage 508 also permanently or temporarily stores data. Some examples of the storage 508 are hard disks and disk drives.

The embodiments discussed herein are illustrative. As these embodiments are described with reference to illustrations, various modifications or adaptations of the methods and/or specific structures described may become apparent to those skilled in the art.

The above-described components and functions can be comprised of instructions that are stored on a computer-readable storage medium. The instructions can be retrieved and executed by a processor (e.g., processor 504). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the communication management engine 104 may employ any of the desired functionality set forth hereinabove. Thus, the breadth and scope of a preferred embodiment should not be limited by any of the above-described exemplary embodiments.

What is claimed is:
1. A method comprising:
receiving communications supported by a plurality of service providers;
determining at least one protocol associated with each of the communications, the at least one protocol configured to control at least one of the communications;

identifying parameters associated with the at least one protocol;

generating a manifest indicating additional parameters regarding the at least one protocol as performed by the service provider supporting the communication, the manifest reflecting all available features of operation and utilized features of a digital device connected to the service provider supporting the communication;

accessing at least one rule based on the at least one protocol, the identified parameters, and the additional parameters indicated by the manifest;

providing a user with at least one communications-control option according to the at least one rule; and combining at least two of the communications into a single communication session based at least in part on the at least one rule, the at least two communications being associated with different protocols.

2. The method of claim 1, wherein the at least two of the communications are each encoded differently.

3. The system of claim 1, further comprising integrating the communications into a threaded discussion.

4. The method of claim 1, wherein a type of communication is associated with the at least one protocol.

5. The method of claim 1, wherein the manifest further indicates how the additional parameters augment the at least one protocol.

6. The method of claim 1, further comprising generating a session list based, at least in part, on a plurality of contact identifiers, each of the plurality of contact identifiers associated with at least one of the communications.

7. A non-transitory computer readable storage medium having embodied thereon a program, the program being executable by a processor for performing a method, the method comprising:

receiving communications supported by a plurality of service providers;

determining at least one protocol associated with each of the communications, the at least one protocol configured to control at least one of the communications;

identifying parameters associated with the at least one protocol;

generating a manifest indicating additional parameters regarding the at least one protocol as performed by the service provider supporting the communication, the manifest reflecting all available features of operation and utilized features of a digital device connected to the service provider supporting the communication;

accessing at least one rule based on the at least one protocol, the identified parameters, and the additional parameters indicated by the manifest;

providing a user with at least one communications-control option according to the at least one rule; and combining at least two of the communications into a single communication session based at least in part on the at least one rule, the at least two communications being associated with different protocols.

8. The non-transitory computer readable storage medium of claim 7, wherein the at least two of the communications are each encoded differently.

9. The non-transitory computer readable storage medium of claim 7, further comprising integrating the communications into a threaded discussion.

10. The non-transitory computer readable storage medium of claim 7, wherein a type of communication is associated with the at least one protocol.

11. The non-transitory computer readable storage medium of claim 7, wherein the manifest further indicates how the additional parameters augment the at least one protocol.

12. The non-transitory computer readable storage medium of claim 7, further comprising generating a session list based, at least in part, on a plurality of contact identifiers associated with at least one of the communications.

13. A system comprising:

an interface module configured to receive communications supported by a plurality of service providers;

a protocol module configured to:
determine at least one protocol associated with each of the communications, the at least one protocol configured to control at least one of the communications;

identify parameters associated with the at least one protocol; and generate a manifest indicating additional parameters regarding the at least one protocol as performed by the service providers supporting the communication, the manifest reflecting all available features of operation and utilized features of a digital device connected to the service provider supporting the communication;

a rules module configured to access at least one rule based on the at least one protocol, the identified parameters, and the additional parameters indicated by the manifest;

a session module configured to provide a user with at least one communications-control option according to the at least one rule; and combining at least two of the communications into a single communication session based at least in part on the at least one rule, the at least two communications being associated with different protocols.

14. The system of claim 13, wherein the at least two of the communications are each encoded differently.

15. The system of claim 13, wherein the session module is further configured to integrate the communications into threaded discussion.

16. The system of claim 13, further comprising a category module configured to associate a type of communication with the at least one protocol.

17. The system of claim 13, wherein the manifest further indicates how the additional parameters augment the at least one protocol.

18. The system of claim 13, wherein the session module is further configured to generate a session list based, at least in part, on a plurality of contact identifiers, each of the plurality of contact identifiers associated with at least one of the communications.

* * * * *